(No Model.)
G. W. WHITEFIELD.
ELECTRICAL DEVICE FOR PREVENTING CRIBBING IN HORSES.
No. 487,461. Patented Dec. 6, 1892.
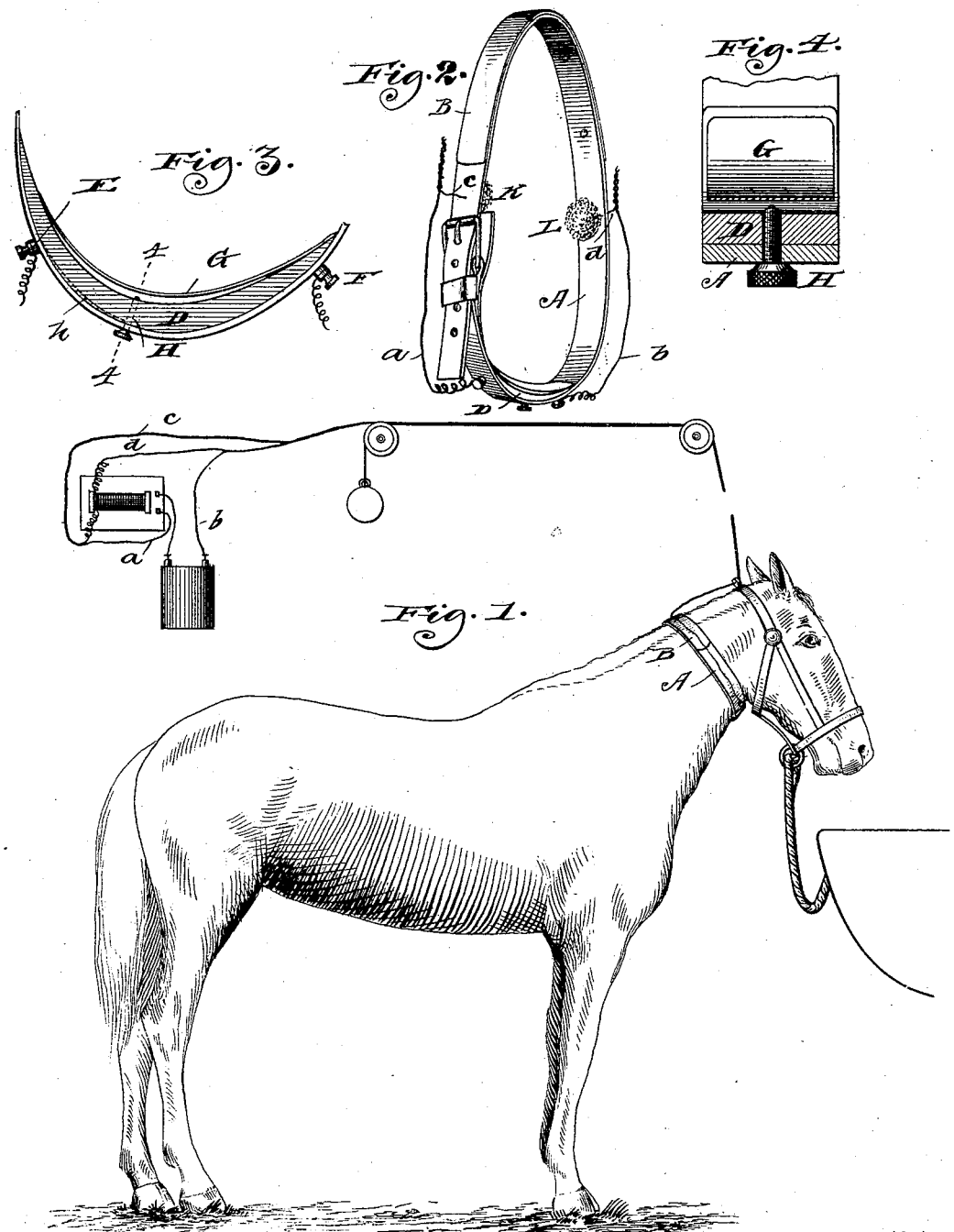

UNITED STATES PATENT OFFICE.

GEORGE W. WHITEFIELD, OF EVANSTON, ILLINOIS.

ELECTRICAL DEVICE FOR PREVENTING CRIBBING IN HORSES.

SPECIFICATION forming part of Letters Patent No. 487,461, dated December 6, 1892.

Application filed September 4, 1891. Serial No. 404,751. (No model.)

*To all whom it may concern:*

Be it known that I, GEORGE W. WHITEFIELD, a citizen of the United States, residing at Evanston, Illinois, have invented certain new and useful Improvements in Electrical Devices for Preventing Cribbing in Horses, of which the following is a specification.

Cribbing or cribbiting is a vicious habit some horses have of affixing the teeth upon the manger, stall, or other object and with the mouth open drawing in air, the respiration making a peculiar sound. The habit is sometimes also called "wind-sucking." It is supposed by some to be occasioned by indigestion; but whatever the cause the effect of the habit upon the horse is exceedingly injurious and many valuable animals are ruined by it. In indulging this habit the animal, in the act of respiration, expands the throat by the enlargement of the wind-pipe, and I base my invention upon this concomitant of the habit in the following manner: I fasten around the neck of the animal a support, preferably in the form of an encircling band, which may be adjusted so as to fit comfortably close to the horse's neck, and mount upon this support the terminals of an electrical circuit and a circuit-closer, which is adapted to be operated by the swelling out or enlargement of the horse's neck in the indulgence of the habit of cribbing. The closing of this electrical circuit is utilized either to send an electric shock through the body of the animal at some point or to ring a bell or operate some other device, which will either frighten the animal or inflict pain or produce some other unusual sensation upon him. The repetition of this punishment following the indulgence in the habit will in a short time break the animal of it.

In the preferred construction of the apparatus I employ a band or strap adjustable as to size to encircle the horse's neck, and at separated points thereon I mount suitable binding posts or screws insulated from each other, to which conductors are affixed, said conductors proceeding, preferably, from opposite poles of a primary source of electricity. I also connect with one of said binding-screws a contact-plate, which is preferably curved and adapted to fit closely the under side of the throat of the animal. A metallic contact-point electrically connected with one binding-screw is placed so that when the animal's neck is abnormally enlarged the movable plate is brought into contact with said point, thus closing the gap in the circuit. The binding-screws form the terminals of a primary circuit which includes a battery or other source of electricity, which operates a secondary coil whose terminals are in contact with some portion of the horse's body—say upon opposite sides of the throat or head. The proper contact may be made by the use of sponges which piovide the requisite moisture, or the terminals may be placed upon some moist part of the body of the animal. The indulgence of this habit by the horse therefore operates to close an electrical circuit, which will impart a shock to the animal, or, if preferred, a bell may be interposed in the circuit which will be rung when the circuit is closed. I use as the preferred source of electricity a dry battery, and coupled therewith an induction-coil, so that the shock given to the animal is from an induced current.

In the accompanying drawings, Figure 1 is a diagrammatic view showing my device applied to an animal. Fig. 2 is a perspective view of the collar or support for the terminals of the electrical circuit and the circuit-closer. Fig. 3 is a detail view of the lower portion thereof in side elevation, and Fig. 4 is a transverse sectional view on the line 4 4 of Fig. 3.

In the drawings, A represents the supporting band or strap, which may be made of leather and provided with a buckle, so as to make it adjustable as to size. I prefer to secure upon the top of this belt a strip of metal B, by bending which the strap may be made to fit closely to the neck of the animal. At the bottom of the strap and upon the inside thereof there is secured a plate of insulating material D of curved form, and to this are affixed the binding-screws E F. To the inner end of the screw F is attached a curved plate G, preferably of spring metal, and the free end of which rests upon the insulating-plate in such manner that there is an opening or space between the two at their middles. An adjustable contact is provided by the screw H, which has a platinum point projected into the space between the plates D and G and connected by the wire *h* with the screw E, and when the plate G is forced down so as to make contact with said point the screws E and F will be electrically connected. The wires *a b* form elements of a primary electrical circuit which includes a battery, the induction-coil, and the binding-screws E F, and this circuit is operated by the circuit-closer G.

*c d* are wires forming elements in a secondary circuit from the induction-coil, including a portion of the body of the horse. As shown, these wires *c d* have separated terminals tipped with sponges K L, carried upon the inside of the collar A, so as to be maintained in constant contact with opposite sides of the horse's neck. These sponges being moistened will enable proper contact to be made, so that when the primary circuit is closed an induced current will pass through the body of the animal at the neck and produce a shock. The unusual sensation produced by the shock soon becomes associated in the animal instinct with the indulgence of the habit of cribbing, and the repetition of the shock for a few times has been found in practice to break up the habit. Of course the effect will be different upon different animals, and the intensity of the shock may be varied. Instead of imparting a shock to the animal, the closing of the electrical circuit may be made to ring a bell or to drop some object upon or in sight of the animal, so as to frighten him, or to operate in other ways to excite or inflict pain upon him.

I do not limit my invention to the details of construction, as they may be considerably varied without departing from the spirit and scope of this invention. The contact H and wire *h* might be omitted if binding-screw E carried a point with which plate G would form contact when moved, or the screw E and wire *h* might be omitted and wire *a* carried to contact-screw H.

I claim—

1. In a device for curing horses of cribbing, the combination of a neck-strap provided with circuit-terminals and a circuit-changer between them, controlled by the throat of the animal, and electric terminals adapted to come into contact with the animal and included in a circuit controlled by the circuit-changer, substantially as described.

2. In a device of the character described, the combination, with the collar A, having flexible adjusting-strap B, of an insulated plate bearing binding-screws forming terminals for an electrical secondary circuit, substantially as described.

GEORGE W. WHITEFIELD.

Witnesses:
C. C. LINTHICUM,
FREDERICK C. GOODWIN.